United States Patent
Cruz-Hernandez et al.

(10) Patent No.: US 10,395,489 B1
(45) Date of Patent: Aug. 27, 2019

(54) GENERATION AND BRAKING OF VIBRATIONS

(71) Applicant: Immersion Corporation, San Jose, CA (US)

(72) Inventors: Juan Manuel Cruz-Hernandez, Westmount (CA); Danny A. Grant, Laval (CA); Vahid Khoshkava, Laval (CA); Christopher Ullrich, Ventura, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 16/010,372

(22) Filed: Jun. 15, 2018

(51) Int. Cl.
*G08B 6/00* (2006.01)
*G06F 3/041* (2006.01)

(52) U.S. Cl.
CPC ............. *G08B 6/00* (2013.01); *G06F 3/0414* (2013.01)

(58) Field of Classification Search
CPC . G06F 3/00; G06F 3/011; G06F 3/016; G06F 3/021; G06F 3/0213; G06F 3/0414; G08B 6/00
See application file for complete search history.

(56) References Cited

U.S. PATENT DOCUMENTS

| | | | |
|---|---|---|---|
| 7,639,232 B2 | 12/2009 | Grant et al. | |
| 7,843,277 B2 | 11/2010 | Gregorio et al. | |
| 8,156,809 B2 | 4/2012 | Tierling et al. | |
| 8,590,379 B2 | 11/2013 | Tierling et al. | |
| 8,791,799 B2 | 7/2014 | Lacroix et al. | |
| 9,202,354 B2 | 12/2015 | Lacroix et al. | |
| 9,513,709 B2 | 12/2016 | Gregorio et al. | |
| 2005/0168046 A1* | 8/2005 | Hadi | B60N 2/50 297/463.2 |
| 2013/0194084 A1 | 8/2013 | Lacroix et al. | |
| 2017/0285747 A1* | 10/2017 | Chen | G08B 6/00 |
| 2018/0269807 A1* | 9/2018 | Khoshkava | H02N 1/004 |
| 2018/0301140 A1* | 10/2018 | Turcott | G08B 6/00 |

\* cited by examiner

*Primary Examiner* — Van T Trieu

(74) *Attorney, Agent, or Firm* — Miles & Stockbridge P.C.

(57) ABSTRACT

An actuator system configured to generate a haptic effect, the actuator system including a housing of an electronic device, the housing being configured to form a mechanical ground, a first actuator disposed between a first moving mass and the mechanical ground, the first actuator being configured to render the haptic effect, and a second actuator disposed between a second moving mass and the mechanical ground, the second actuator being configured to dampen the haptic effect.

15 Claims, 4 Drawing Sheets

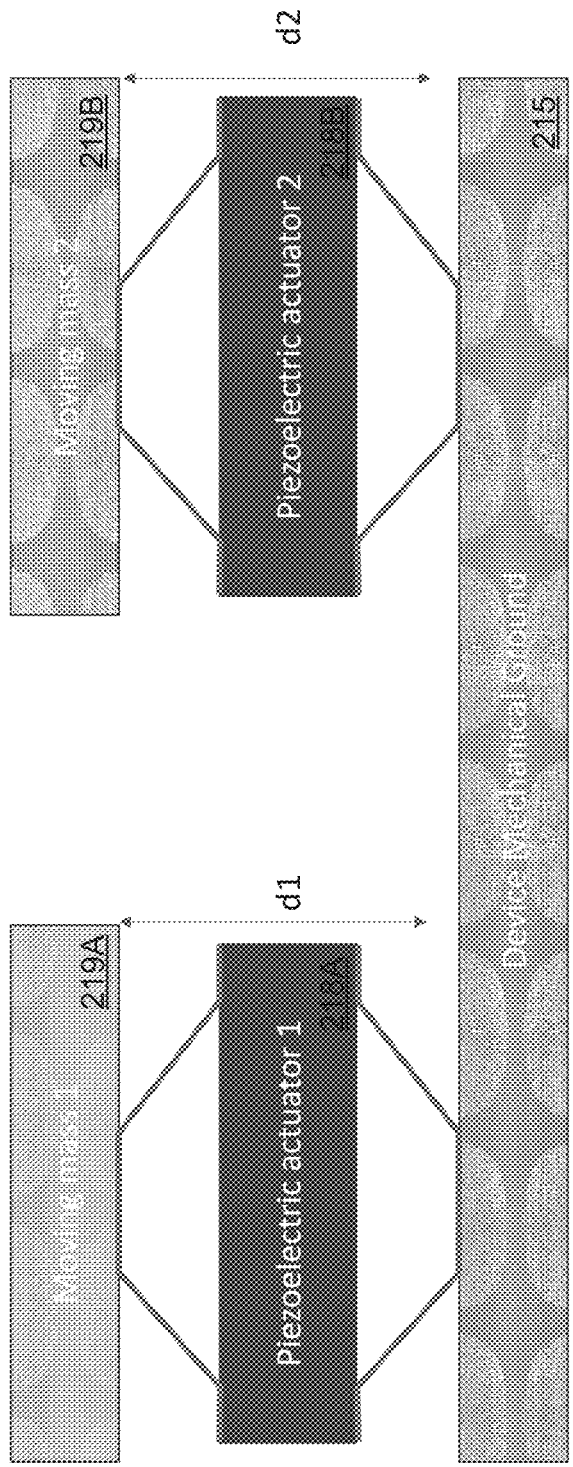

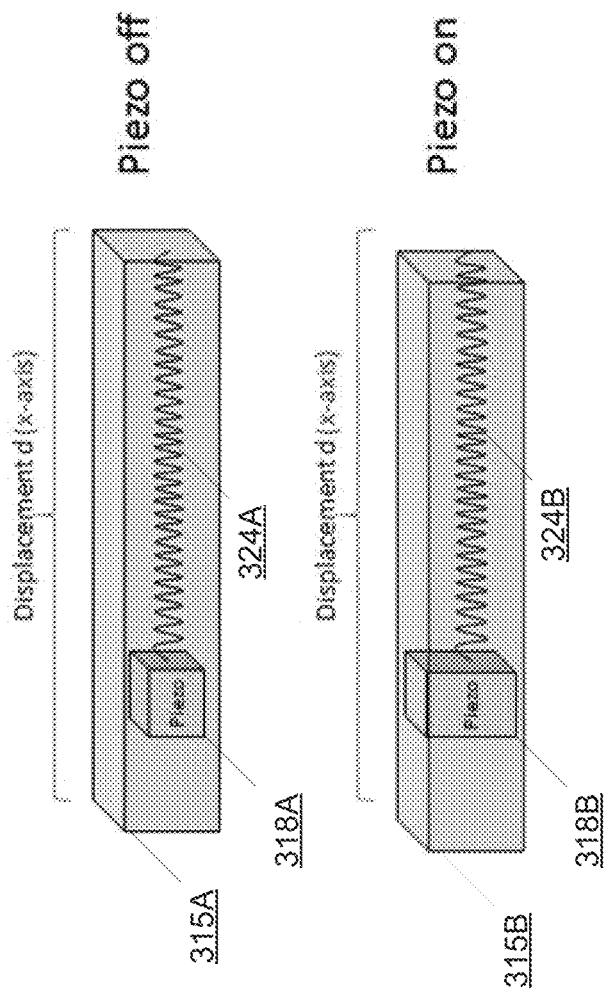

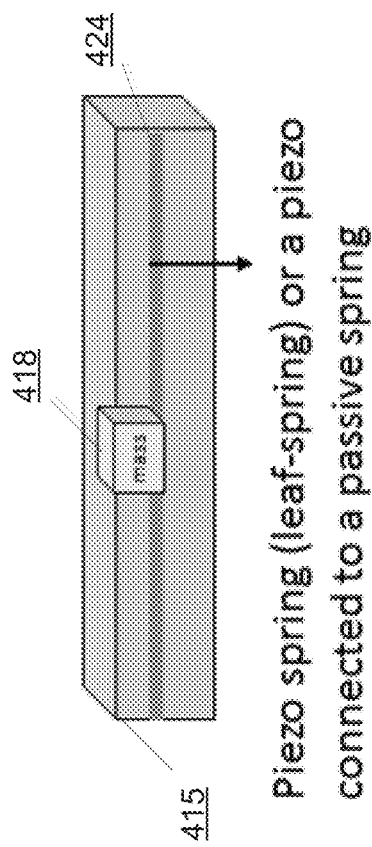

US 10,395,489 B1

GENERATION AND BRAKING OF VIBRATIONS

FIELD OF INVENTION

The embodiments of the present invention are generally directed to electronic devices, and more particularly, to electronic devices that produce haptic effects.

BACKGROUND

Electronic device manufacturers strive to produce a rich interface for users. Conventional devices use visual and auditory cues to provide feedback to a user. In some interface devices, kinesthetic feedback (e.g., active and resistive force feedback) and/or tactile feedback (e.g., vibration, texture, and heat) is also provided to the user, more generally known collectively as "haptic feedback" or "haptic effects." Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

With the continued development of mobile devices, such as smart phones and tablets, users are now able to view high definition audio and video on a handheld device that traditionally could only be seen in movie theaters, television or home theater systems. With haptically-enabled mobile devices, experience has shown that content viewing is sufficiently enhanced, and viewers like it, if there is a haptic content component in addition to the audio and video content components. However, in order to be compatible with the high definition audio/video, for example, crisper haptic effects are needed, and provided herein.

SUMMARY OF THE INVENTION

Embodiments of the present invention are directed toward electronic devices configured to produce haptic effects that substantially improve upon the related art.

Features and advantages of the embodiments are set forth in the description which follows, or will be apparent from the description, or may be learned by practice of the invention.

In one example, an actuator system is configured to generate a haptic effect, such as a crisp haptic effect. The actuator system includes a housing of an electronic device, the housing being configured to form a mechanical ground, a first actuator disposed between a first moving mass and the mechanical ground, the first actuator being configured to render the haptic effect, and a second actuator disposed between a second moving mass and the mechanical ground, the second actuator being configured to dampen the haptic effect.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 2 illustrates a multi-actuator system for generating crisp haptic effects according to an example embodiment of the present invention.

FIG. 3 illustrates an actuator system for generating crisp haptic effects according to an example embodiment of the present invention.

FIG. 4 illustrates an actuator system for generating crisp haptic effects according to another example embodiment of the present invention.

DETAILED DESCRIPTION

Figure 1:
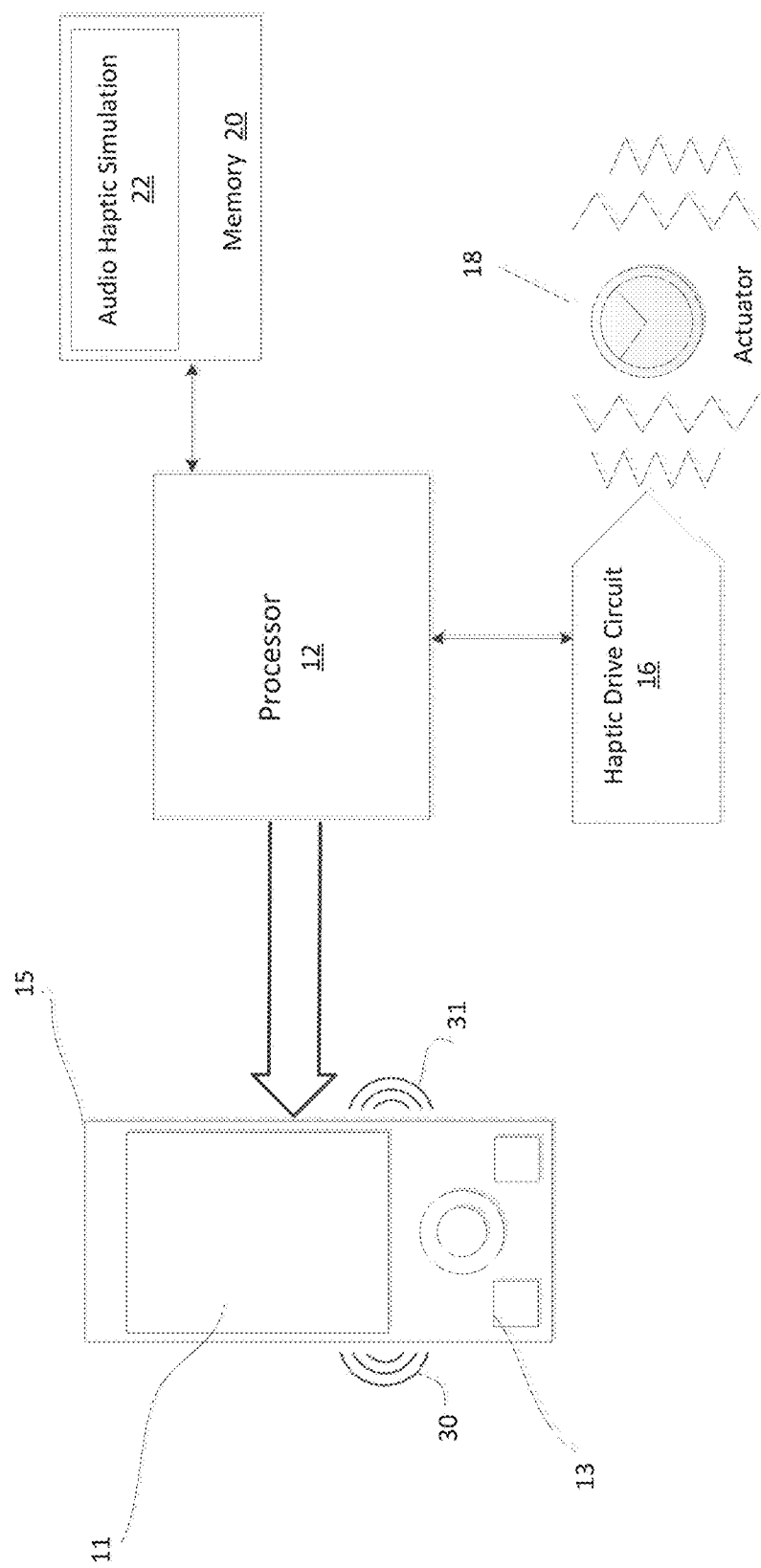
FIG. 1 is a block diagram of a haptically-enabled system/device according to an example embodiment of the present invention.

Reference will now be made in detail to the embodiments, examples of which are illustrated by the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

The example embodiments are generally directed toward improved haptic systems. In the various embodiments, a single or multi-actuator system is configured to generate "crisp" haptic (vibrotactile) effects. In particular, the single and multi-actuator embodiments described herein are configured to dampen or cancel undesired vibrations that occur after the rendering of one or more haptic effects. For example, a first actuator may be configured to generate haptic effects and a second actuator may be configured to dampen or cancel the remaining or residual vibrations after the rendering of the haptic effect. In another example embodiment, a piezoelectric actuator may comprise a moving mass, and be configured to brake the movement of the actuator. In another example embodiment, an electromagnetically driven moving mass is provided on a piezo spring (also referred to as a "leaf spring" or "piezo beam"). The piezo spring acts as a spring for the moving mass and also may be activated to stop the moving mass, thereby acting as a braking mechanism.

FIG. 1 is a block diagram of a haptically-enabled system/device 10 according to an example embodiment of the present invention. System 10 includes a touch sensitive surface 11 or other type of user interface mounted within a housing 15, and may include mechanical keys/buttons 13.

Internal to system 10 is a haptic feedback system that generates haptic effects on system 10 and includes a processor or controller 12. Coupled to processor 12 is a memory 20, and a haptic drive circuit 16 which is coupled to an actuator 18. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

The haptic feedback system in one embodiment generates vibrations 30, 31 or other types of haptic effects on system 10.

Processor 12 outputs the control signals to haptic drive circuit 16, which includes electronic components and circuitry used to supply actuator 18 with the required electrical current and voltage (i.e., "motor signals") to cause the desired haptic effects. System 10 may include more than one actuator 18, and each actuator 18 may include a separate drive circuit 16, all coupled to a common processor 12.

Haptic drive circuit 16 is configured to generate one or more haptic drive signals. For example, the haptic drive signal may be generated at and around the resonance frequency (e.g., +/−20 Hz, 30 Hz, 40 Hz, etc.) of actuator 16. In certain embodiments, haptic drive circuit 16 may comprise a variety of signal processing stages, each stage defining a subset of the signal processing stages applied to generate the haptic command signal.

Non-transitory memory 20 may include a variety of computer-readable media that may be accessed by processor 12. In the various embodiments, memory 20 and other memory devices described herein may include a volatile and nonvolatile medium, removable and non-removable medium. For example, memory 20 may include any combination of random access memory ("RAM"), dynamic RAM ("DRAM"), static RAM ("SRAM"), read only memory ("ROM"), flash memory, cache memory, and/or any other type of non-transitory computer-readable medium. Memory 20 stores instructions executed by processor 12. Among the instructions, memory 20 includes audio haptic simulation module 22, which are instructions that, when executed by processor 12, generates high bandwidth haptic effects using speaker 28 and actuator 18, as disclosed in more detail below. Memory 20 may also be located internal to processor 12, or any combination of internal and external memory.

System 10 may be any type of handheld/mobile device, such as a cellular telephone, personal digital assistant ("PDA"), smartphone, computer tablet, gaming console, controller or split controller, remote control, or any other type of device that includes a haptic effect system that includes one or more actuators. System 10 may be a wearable device such as wrist bands, headbands, eyeglasses, rings, leg bands, arrays integrated into clothing, etc., or any other type of device that a user may wear on a body or can be held by a user and that is haptically enabled, including furniture or a vehicle steering wheel. Further, some of the elements or functionality of system 10 may be remotely located or may be implemented by another device that is in communication with the remaining elements of system 10.

Actuator 18 may be any type of actuator or haptic output device that can generate a haptic effect. In general, an actuator is an example of a haptic output device, where a haptic output device is a device configured to output haptic effects, such as vibrotactile haptic effects, electrostatic friction haptic effects, temperature variation, and/or deformation haptic effects, in response to a drive signal. Although the term actuator may be used throughout the detailed description, the embodiments of the invention may be readily applied to a variety of haptic output devices. Actuator 18 may be, for example, an electric motor, an electro-magnetic actuator, a voice coil, a shape memory alloy, an electroactive polymer, a solenoid, an eccentric rotating mass motor ("ERM"), a harmonic ERM motor ("HERM"), a linear resonance actuator ("LRA"), a solenoid resonance actuator ("SRA"), a piezoelectric actuator, a macro fiber composite ("MFC") actuator, a high bandwidth actuator, an electroactive polymer ("EAP") actuator, an electrostatic friction display, an ultrasonic vibration generator, or the like. In some instances, the actuator itself may include a haptic drive circuit. In the description that follows, a piezoelectric actuator may be used as an example, but it should be understood that the embodiments of the present invention may be readily applied to any type of actuator or haptic output device.

Currently, there is a high degree of variance between similarly rated actuators. As a result, the similarly rated actuators often produce inconsistent haptic responses. The variance is especially large between different actuator manufacturers, but is still significant among actuators produced by a single manufacturer. Variance between similarly rated actuators is especially perceptible for the generation of "crisp" haptic effects.

Crisp haptic effects include short duration haptic effects (e.g., 5 ms) that reach a relatively high or peak acceleration value (e.g., 2.5 peak to peak gravities "Gpp", or 3.5 Gpp). In other words, during the generation of a crisp haptic effect, the actuator may reach a high or peak acceleration in less than one cycle. In addition, the actuator returns to a stopped position within 5 ms after drive signal is removed. For a crisp haptic effect, minimal (e.g., imperceptible) or no vibrations remain after rendering the effect regardless of the driving frequency of the actuator.

Generation of high acceleration haptic effects within 5 ms generally uses an actuator that generates vibrations in the range of 100 Hz and over. For example, a single oscillation to drive a haptic effect may have duration of 10 ms, and thus, by the mid-point of the driving signal, that is 5 ms, the acceleration is already high.

The generation of crisp haptic effects is subject to numerous drawbacks. The generation of crisp haptic effects is difficult to achieve using some electromechanical actuators (e.g., LRA and ERM). Also, some known techniques at most function with high resonant systems and are unable to produce high acceleration values in a short duration (e.g., 5 ms). Other known techniques attempt to modify the haptic drive signal by using a closed-loop haptic drive circuit. Such known drive circuits have been adapted to produce "crisp" haptic effects. However, such techniques are overly complex and costly due to the incorporation of expensive sensors.

FIG. 2 illustrates a multi-actuator system 200 for generating crisp haptic effects according to an example embodiment of the present invention.

As illustrated in FIG. 2, multi-actuator system 200 includes a first piezoelectric actuator 218A and a second piezoelectric actuator 218B. Each of first and second piezoelectric actuators 218A, 218B is disposed between, and coupled to, a mechanical ground 215 and a respective moving mass. In this example configuration, first piezoelectric actuator 218A is coupled to first moving mass 219A and second piezoelectric actuator 218B is coupled to second moving mass 219B. The multi-actuator system 200, including first and second piezoelectric actuators 218A, 218B, is configured to generate one or more haptic effects, including crisp haptic effects.

In multi-actuator system 200, the embodiments may rely upon first piezoelectric actuator 218A to generate one or more haptic effects and may further rely upon second piezoelectric actuator 218B for vibration dampening/cancellation, or vice versa. In an alternative configuration, both of first and second piezoelectric actuators 218A, 218B may be configured to produce one or more haptic effects, and the motion of both first and second piezoelectric actuators 218A, 218B may be inverted to generate a braking signal and/or braking force that is tuned for vibration dampening/cancellation.

To stop a haptic effect, such as in the production of a crisp haptic effect, remaining or residual oscillations of the haptic effect are removed. Such remaining vibrations may also be referred to as a "vibrations tail."

In the various embodiments, first and second piezoelectric actuators 218A, 218B may be driven using known or expected open- or closed-loop drive circuits. When using a closed-loop drive circuit, second piezoelectric actuator 218B may be further configured as a sensor for the closed-loop control process. By configuring an actuator, such as second piezoelectric actuator 218B, as the sensor for a closed-loop drive circuit, the cost associated with a dedicated sensor is avoided. Here, one actuator generates one or more haptic effects. And, the other actuator is configured as both a sensor to monitor the remaining vibrations of the one or more haptic effects and to apply a braking signal or force to remove undesired vibrations. In other configurations, the remaining vibrations may be detected using a dedicated sensor. The dedicated sensor may be engaged to monitor vibrations after the processing of the haptic drive signal. Dedicated sensors may be used in connection with actuator types that cannot be configured as a sensor.

First and second moving masses 219A, 219B may be standalone components or may comprise, or be otherwise coupled to, other components of the host electronic device, such as a push button, rotatable knob, screen, touchscreen, digital crown, and the like. Additionally, or alternatively, first and second moving masses 219A, 219B may have the same or different sizes (e.g., the mass of 219A may be greater than, less than, or equal to the mass of 219B). More importantly, the moving mass corresponding to the actuator used for vibration dampening/cancellation are calibrated or tuned to quickly eliminate any undesired vibrations that remain after the rendering of the haptic effect. For example, the size of the moving mass may be determined according to the frequency of the vibrations tail.

Mechanical ground 215 may be the housing of the host electronic device, such as housing 15 of FIG. 1. Although mechanical ground 215 is depicted as a single element, multiple mechanically coupled elements may collectively form mechanical ground 215. For example, the touchscreen and housing of a smartphone may collectively form mechanical ground 215. Here, the touchscreen and the housing are mechanically coupled and may jointly render vibrations. In another example, the housing and band of a wearable device may collectively form mechanical ground 215. Here again, the housing and band are mechanically coupled and may jointly render vibrations. In the example configuration depicted in FIG. 2, first and second piezoelectric actuators 218A, 218B have respective displacements d1, d2 in the same direction. However, depending on the configuration of first and second moving masses 219A, 219B as well as mechanical ground 215, the respective displacements d1, d2 may vary.

Although a piezoelectric actuator is described in this example embodiment, any type of actuator or haptic output device may be used. Haptic output devices may include any haptic output device, such as the various haptic output devices described in connection with actuator 18 of FIG. 1. In configurations using haptic output devices other than piezoelectric actuators, a dedicated sensor may be used in combination with the second actuator. Alternatively, piezoelectric actuators may be configured to function as both an actuator and a sensor. Piezoelectric actuators and dedicated sensor may be configured to continually or periodically monitor the vibrations output by actuator 218, and the sensed vibrations may be applied as a closed-loop feedback signal in a haptic drive circuit. The sensor may be mounted on the piezoelectric actuator itself (e.g., a strain gauge), or the sensor may be mounted on the body of the host electronic device (e.g., an accelerometer).

Additionally, or alternatively, first and second piezoelectric actuators 218A, 218B may be configured to have the same or different resonant frequencies. The resonant frequency first piezoelectric actuator 218A may be greater than, less than, or equal to the resonant frequency of second piezoelectric actuator 218B. More importantly, the resonant frequency of the actuator(s) used for vibration dampening/cancellation are calibrated or tuned to quickly eliminate any undesired vibrations that remain after the rendering of the haptic effect.

FIG. 3 illustrates an actuator system 300 for generating crisp haptic effects according to an example embodiment of the present invention. As illustrated in FIG. 3, actuator system 300 includes a mechanical ground 315, a piezoelectric moving mass 318 which includes, or is formed of, one or more piezoelectric actuators, and a spring 324.

In some actuator types, such as the LRA type actuator, a moving mass is typically mounted on an electromechanical part, such as a spring 324. In this embodiment, a piezoelectric moving mass 318 is introduced. Piezoelectric moving mass 318 includes, or is formed of, one or more piezoelectric actuators. In other words, piezoelectric actuators may either be added to the moving mass, or alternatively, may comprise the moving mass. As illustrated in FIG. 3, example actuator system 300 includes two states. The two states of actuator system 300 will now be described.

When one or more haptic effects are being rendered, the piezoelectric moving mass 318, illustrated as 318A, is in an "Off" state. In other words, piezoelectric moving mass 318 is not engaged. Accordingly, piezoelectric moving mass 318A is configured to be driven by spring 324, illustrated as 324A, such that the haptic effects may be rendered. Here, movement of piezoelectric moving mass 318A is not encumbered by mechanical ground 315, illustrated as 315A.

However, when activating braking, piezoelectric moving mass 318 is engaged and configured to expand. In this "On" state, piezoelectric moving mass 318, illustrated as 318B, expands and causes friction with an adjacent part, such as mechanical ground 315, illustrated as 315ϐ. As a result of the expansion of piezoelectric moving mass 318ϐ, the vibrations of the actuator are dampened/cancelled. Additionally, during braking, the electromechanical components, such as spring 324B, are deactivated.

Mechanical ground 315 may be the housing of the host electronic device, such as housing 15 of FIG. 1. Although mechanical ground 315 is depicted as a single element, multiple mechanically coupled elements may collectively form mechanical ground 315.

Although FIG. 3 illustrates an example configuration of a single-actuator system, numerous other configurations may be readily configured. For example, one or more piezoelectric actuators may be coupled to a piezoelectric moving mass. In another example, one or more piezoelectric actuators may be coupled to a traditional moving mass. In either configuration, the inclusion of multiple piezoelectric actuators on the moving mass may be configured to further increase friction and to more quickly stop the moving mass. In other example configurations, the actuators may be disposed along any axis of the host electronic device (e.g., opposite or adjacent portions of the housing). The various haptic output devices of actuator system 300 may be driven by an open- or closed-loop drive circuit.

FIG. 4 illustrates an actuator system 400 for generating crisp haptic effects according to another example embodiment of the present invention. As illustrated in FIG. 4, actuator system 400 includes a mechanical ground 415, a moving mass 418, and a piezoelectric spring 424 (also referred to as a "leaf spring" or "piezo beam").

To render one or more haptic effects, moving mass 418 is driven by a magnetic field (not shown) to induce movement of moving mass 418 and to cause vibration. As compared to the embodiments of FIG. 3, in which piezoelectric moving mass 318 is electromechanically driven by spring 324, moving mass 418 is electromagnetically driven along a piezoelectric material, such as piezoelectric spring 424. In the various embodiments, piezoelectric spring 424 is an active spring and comprises the actuator.

When one or more haptic effects are being rendered, moving mass 418 is driven to move and to produce vibrations. Here, motion of moving mass 418 is not encumbered by piezoelectric spring 424. However, when activating braking, piezoelectric spring 424 is engaged. In some instances, the stiffness of piezoelectric spring 424 may be calibrated or tuned according to the resonant frequency of the actuator. Alternatively, or additionally, piezoelectric spring 424 may cause moving mass 418 to a stop position at either end of piezoelectric spring 424. In another example, piezoelectric spring 424 may be configured to expand. Expansion of piezoelectric spring 424 causes friction with moving mass 418. Here, expansion of piezoelectric spring 424 induces friction between moving mass 418 and mechanical ground 415. As a result of the expansion of piezoelectric spring 424, the vibrations of the actuator are dampened/cancelled. Additionally, during braking, the magnetic field that drives moving mass 418 is deactivated.

In some embodiments, piezoelectric spring 424 is activated at the end or near to the end of the haptic effect. In one example, for a 10 ms haptic effect, at the end of the haptic effect or at time duration of 9.8 ms, piezoelectric spring 424 may be activated to cancel/dampen the vibrations of moving mass 418. As the free oscillation frequency is known, piezoelectric spring 424 can be activated at, or otherwise tuned to, that frequency (e.g., out of phase with the free oscillation frequency) to cancel/dampen any remaining vibrations. In another example, moving mass 418 is driven with an electromagnetic field, and when the desired haptic effect is finished (e.g., at time duration of 10 ms), piezoelectric spring 424 can be activated to counterbalance the movement of moving mass 418.

In yet another example, a bimorph structure may be used. Here, two piezoelectric actuators may be bonded with the same working mechanism on a passive spring. One piezoelectric actuator drives the moving mass, and the other piezoelectric actuator is engaged when braking is needed. In other words, a second piezoelectric actuator can cancel the haptic effect(s) of the first piezoelectric actuator.

Mechanical ground 415 may be the housing of the host electronic device, such as housing 15 of FIG. 1. Although mechanical ground 415 is depicted as a single element, multiple mechanically coupled elements may collectively form mechanical ground 415.

Although FIG. 4 illustrates an example configuration of a single-actuator system, numerous other configurations may be readily configured. For example, one or more piezoelectric actuators comprise the moving mass. In another example, one or more piezoelectric actuators may be coupled to a traditional moving mass. In either configuration, the inclusion of multiple piezoelectric actuators on the moving mass may be configured to more quickly stop the moving mass. In other example configurations, the piezoelectric spring may be configured to both further drive the moving mass by varying the stiffness of the piezoelectric spring (e.g., add force, speed, etc) as well as cause braking as described above. The various haptic output devices of actuator system 400 may be driven by an open- or closed-loop drive circuit.

In the various embodiments discussed above, single and multi-actuator systems are configured to generate crisp haptic effects. The single and multi-actuator embodiments described herein are configured to dampen/cancel undesired vibrations that occur after the rendering of one or more haptic effects.

One having ordinary skill in the art will readily understand that the invention as discussed above may be practiced with steps in a different order, and/or with elements in configurations which are different than those which are disclosed. Additionally, one of ordinary skill in the art will readily understand that features of the various embodiments may be practiced in various combinations. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An actuator system configured to generate a haptic effect, the actuator system comprising:
   a housing of an electronic device, the housing being configured to form a mechanical ground;
   a first actuator disposed between a first moving mass and the mechanical ground, the first actuator being configured to render the haptic effect; and
   a second actuator disposed between a second moving mass and the mechanical ground, the second actuator being configured to dampen the haptic effect.

2. The actuator system according to claim 1,
   wherein the first actuator and the second actuator are mechanically coupled to a pushable user input element and/or a rotatable user input element.

3. The actuator system according to claim 1,
   wherein a size of the second moving mass is calibrated to dampen the haptic effect according to a resonant frequency of the first actuator.

4. The actuator system according to claim 1,
   wherein the mechanical ground includes another component that is mechanically coupled to the housing.

5. The actuator system according to claim 1,
   wherein the first actuator is driven by a closed-loop drive circuit or an open-loop drive circuit.

6. The actuator system according to claim 1,
   wherein the second actuator is driven by a closed-loop drive circuit or an open-loop drive circuit.

7. The actuator system according to claim 6,
   wherein the second actuator is configured as a sensor for the closed-loop drive circuit.

8. The actuator system according to claim 1,
   wherein each of the first actuator and the second actuator is a piezoelectric actuator.

9. The actuator system according to claim 8,
   wherein a motion of the second actuator is inverted to generate a braking force that is tuned to dampen the haptic effect.

10. The actuator system according to claim 1,
wherein the haptic effect has a duration of approximately 5 ms, and
wherein the haptic effect reaches a peak acceleration value of at least 2.5 Gpp within the duration.

11. The actuator system according to claim 1, further comprising:
a sensor that is configured to monitor vibration after rendering the haptic effect.

12. The actuator system according to claim 11,
wherein the sensor is mounted on one of the first actuator, the second actuator, or the housing.

13. The actuator system according to claim 1,
wherein the first actuator has a first resonant frequency and the second actuator has a second resonant frequency.

14. The actuator system according to claim 13,
wherein the second resonant frequency is different than the first resonant frequency.

15. The actuator system according to claim 14,
wherein the second resonant frequency is calibrated to eliminate vibrations of the haptic effect within 5 ms.

* * * * *